United States Patent
Magnuson

(10) Patent No.: US 8,522,474 B1
(45) Date of Patent: Sep. 3, 2013

(54) FISHING LEADER HOLDING AND STORAGE ASSEMBLY

(76) Inventor: John Magnuson, Renner, SD (US)

(*) Notice: Subject to any disclaimer, the term of this patent is extended or adjusted under 35 U.S.C. 154(b) by 142 days.

(21) Appl. No.: 12/970,269

(22) Filed: Dec. 16, 2010

(51) Int. Cl.
*A01K 97/06* (2006.01)

(52) U.S. Cl.
USPC ............................ 43/57.2; 43/54.1; 43/57.1

(58) Field of Classification Search
USPC .................. 43/54.1, 57.1, 57.2, 57.3
See application file for complete search history.

(56) References Cited

U.S. PATENT DOCUMENTS

| | | | | |
|---|---|---|---|---|
| 2,422,870 A | * | 6/1947 | Willis | 43/57.2 |
| 2,559,780 A | * | 7/1951 | Martinson | 242/125.1 |
| 2,670,564 A | * | 3/1954 | Keener | 43/57.2 |
| 3,033,487 A | * | 5/1962 | Walker | 242/405.1 |
| 3,039,226 A | * | 6/1962 | Bagdonas | 43/57.2 |
| 3,126,662 A | * | 3/1964 | White | 43/57.2 |
| 3,980,737 A | * | 9/1976 | D'Alelio | 558/182 |
| 4,030,228 A | * | 6/1977 | Schaefers | 43/57.2 |
| 4,179,834 A | * | 12/1979 | Thomas | 43/57.2 |
| 4,200,249 A | * | 4/1980 | Synstelien et al. | 242/396.5 |
| 4,414,771 A | | 11/1983 | Martin | |
| 4,930,250 A | | 6/1990 | Carson | |
| 5,018,298 A | | 5/1991 | Spears | |
| 5,501,030 A | | 3/1996 | Markle | |
| 5,544,442 A | * | 8/1996 | Perkins | 43/57.2 |
| 6,481,150 B1 | * | 11/2002 | Mahowald | 43/57.2 |
| 6,694,668 B2 | | 2/2004 | Barnett | |
| 6,962,020 B2 | | 11/2005 | Gonzalez | |
| 7,627,980 B2 | * | 12/2009 | Rathsack | 43/57.2 |
| 2004/0250463 A1 | | 12/2004 | Haines | |
| 2005/0198891 A1 | | 9/2005 | Gonzalez | |

* cited by examiner

*Primary Examiner* — David Parsley

(57) ABSTRACT

A fishing leader holding includes a cylinder that is positioned between and is attached to a first lateral wall and a second lateral wall. Each of the first and second lateral walls has a perimeter edge extending outwardly from the cylinder to define a spool. A catch is attached to the perimeter edge of one of the first or second lateral walls. The catch is configured to engage a hoop of a fishing leader when a fishing leader is extended along the cylinder. A hold is attached to the perimeter edge of one of the first or second lateral walls. A tether is configured to engage a hook of the fishing leader. The tether is releasably engageable with the hold. The cylinder is configured to receive the fishing leader such that the fishing leader extends around the cylinder and is retained on the cylinder with the hold and the catch.

1 Claim, 4 Drawing Sheets

FISHING LEADER HOLDING AND STORAGE ASSEMBLY

BACKGROUND OF THE DISCLOSURE

Field of the Disclosure

The disclosure relates to fishing leader holding devices and more particularly pertains to a new fishing leader holding device for holding one or more fishing leaders in such a manner that the leaders are organized but will not retain the memory of their stored orientation.

SUMMARY OF THE DISCLOSURE

An embodiment of the disclosure meets the needs presented above by generally comprising a cylinder that is positioned between and is attached to a first lateral wall and a second lateral wall. Each of the first and second lateral walls has a perimeter edge extending outwardly from the cylinder to define a spool. A catch is attached to the perimeter edge of one of the first or second lateral walls. The catch is configured to engage a hoop of a fishing leader when a fishing leader is extended along the cylinder. A hold is attached to the perimeter edge of one of the first or second lateral walls. A tether is configured to engage a hook of the fishing leader. The tether is releasably engageable with the hold. The cylinder is configured to receive the fishing leader such that the fishing leader extends around the cylinder and is retained on the cylinder with the hold and the catch.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
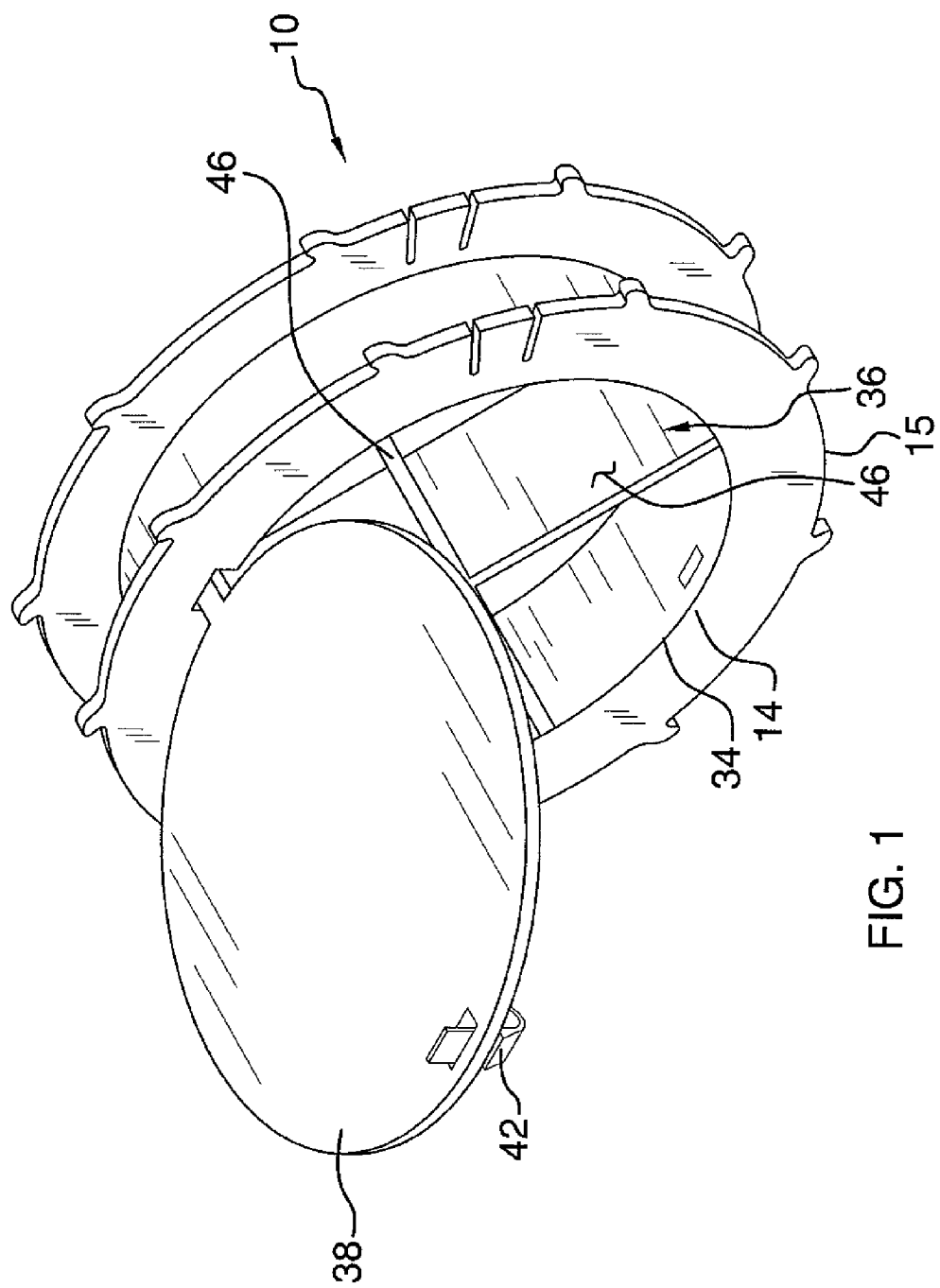
FIG. 1 is a front perspective view of a fishing leader holding and storage assembly according to an embodiment of the disclosure.
Figure 3:
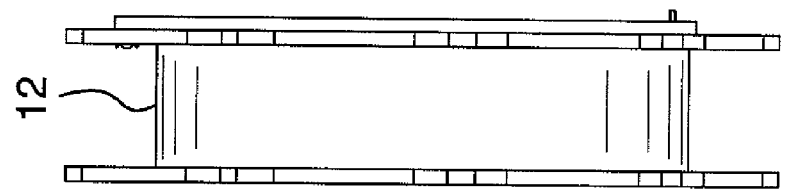
FIG. 3 is a side view of an embodiment of the disclosure.
Figure 2:
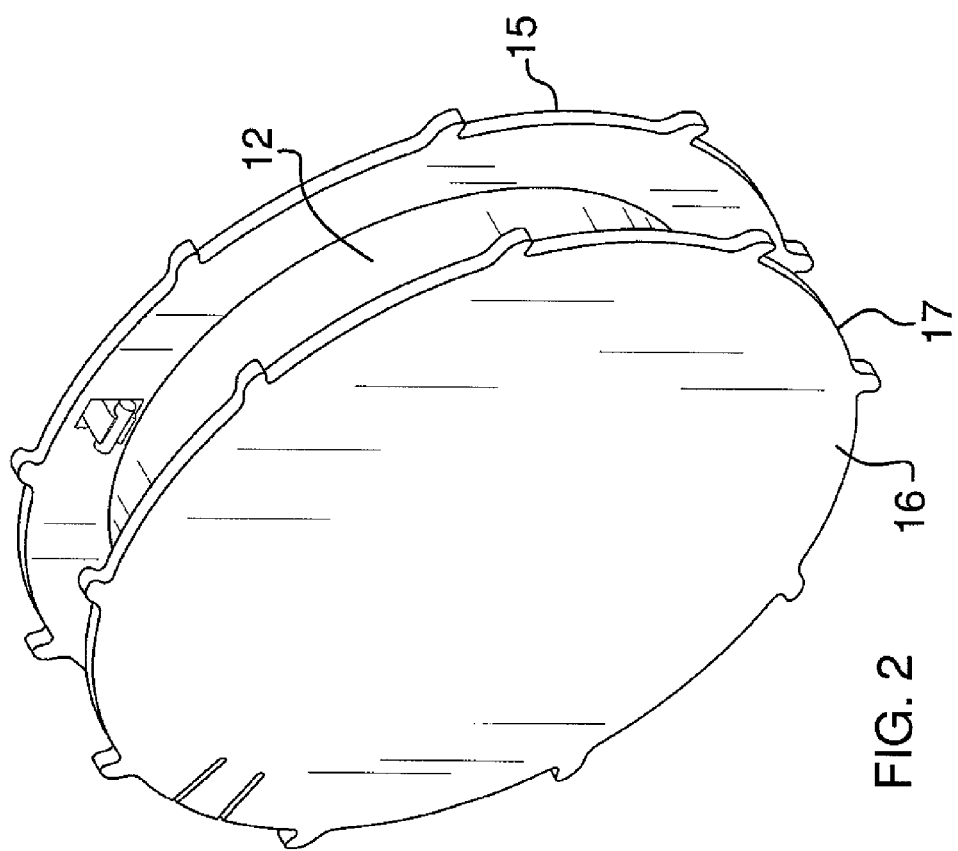
FIG. 2 is a rear perspective view of an embodiment of the disclosure.
Figure 5:
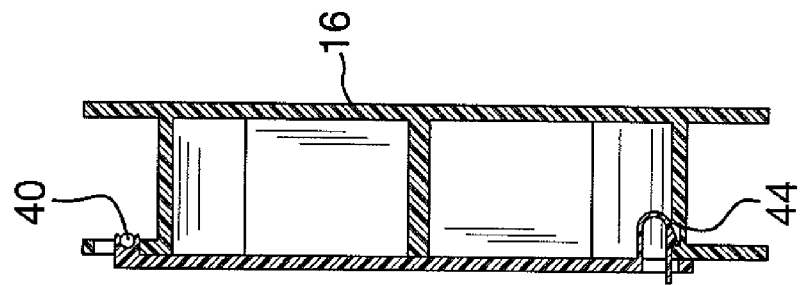
FIG. 5 is a cross-sectional view of an embodiment of the disclosure taken alone line 5-5 of FIG. 4.
Figure 4:
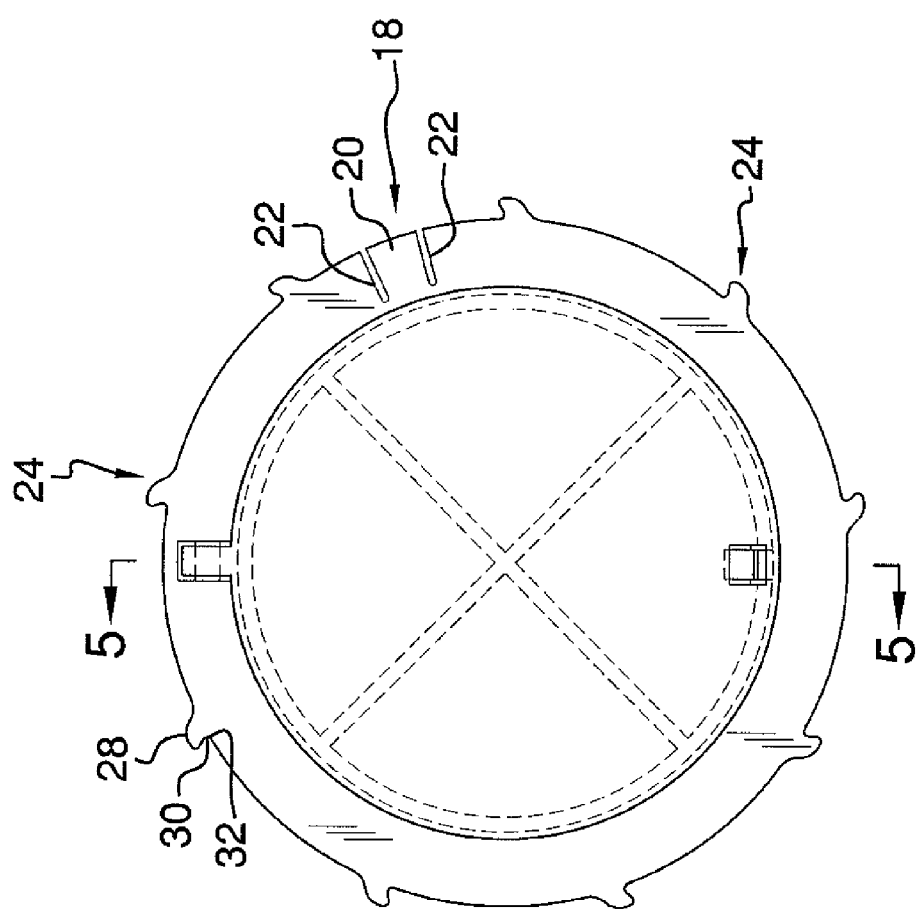
FIG. 4 is a front view of an embodiment of the disclosure.

With reference now to the drawings, and in particular to FIGS. 1 through 6 thereof, a new fishing leader holding device embodying the principles and concepts of an embodiment of the disclosure and generally designated by the reference numeral 10 will be described.

As best illustrated in FIGS. 1 through 6, the fishing leader holding and storage assembly 10 generally comprises a cylinder 12 that is positioned between and is attached to a first lateral wall 14 and a second lateral wall 16. Each of the first 14 and second 16 lateral walls has a perimeter edge 15 and 17, respectively, extending outwardly from the cylinder 12 to define a spool type shape. The cylinder 12 may have a diameter between 7.5 cm and 16.0 cm for reasons which will be discussed below.

A plurality of catches 18 is provided and each of the perimeter edges 15, 17 of the first 14 and second 16 lateral walls includes at least one of the catches 18. Though an embodiment is conceived which includes only a single catch 18 such that only one of the first 14 and second 16 lateral walls includes a catch. Each of the catches 18 is configured to engage a hoop 71 of a fishing leader 70 when a fishing leader 70 is extended along the cylinder 12. Each of the catches 18 may comprise a tab 20 formed between a pair of notches 22 extending into a corresponding one of the perimeter edges 15, 17.

A plurality of holds 24 is also provided. Each of the perimeter edges 15, 17 of the first 14 and second 16 lateral walls includes at least one of the holds 24. However, it is again contemplated that the assembly 10 may only include one hold 24 such that only one of the first 14 and second 16 lateral walls includes a hold 24. A tether 26 is configured to engage a hook 72 of the fishing leader 70. The tether 26 is releasably engaged with one of the holds 24. Each of the holds 24 may comprise a protrusion 28 extending radially away from a central area of a corresponding one of the first 14 and second 16 lateral walls. The protrusions 28 may lie in a plane of the first 14 or second 16 lateral wall to which they are attached. Each of the protrusions 28 has at least one concavely arcuate edge 30 to frictionally engage the tether 26. As can be seen, particularly in FIG. 5, this forms a notch 32 at junctions of the perimeter edges 15, 17 and the protrusions 28 to prevent the tether 26 from slipping off of the holds 24. The tether 26 includes a loop for receiving one of the holds 24 and may further include a loop for receiving the hook 72. This may be accomplished with a pair of loops attached together by filament or by a single loop as would be available with a conventional rubber band. The tether 26 may be comprised of a resiliently elastomeric material.

The first wall 14 may further have an opening 34 therein to access a compartment 36 bounded by the second wall 16 and the cylinder 12. The compartment 36 may be used for storing a variety of fishing implements such as weights, hooks and the like. A door 38 is pivotally coupled to the first wall 14, such as with a hinge 40, and is selectively positioned in a closed positioned covering the opening 34 or in an open position exposing the opening 34. A conventional means is used for retaining the door 38 in a closed position. This may include a detent 42 releasably insertable into a slot 44 or, for instance, the door 38 may be snap fit into a closed positioned frictionally engaging the first wall 14. A plurality of dividing walls 46 may further be positioned within the compartment to divide the compartment 36 into a plurality of sections.

Figure 6:
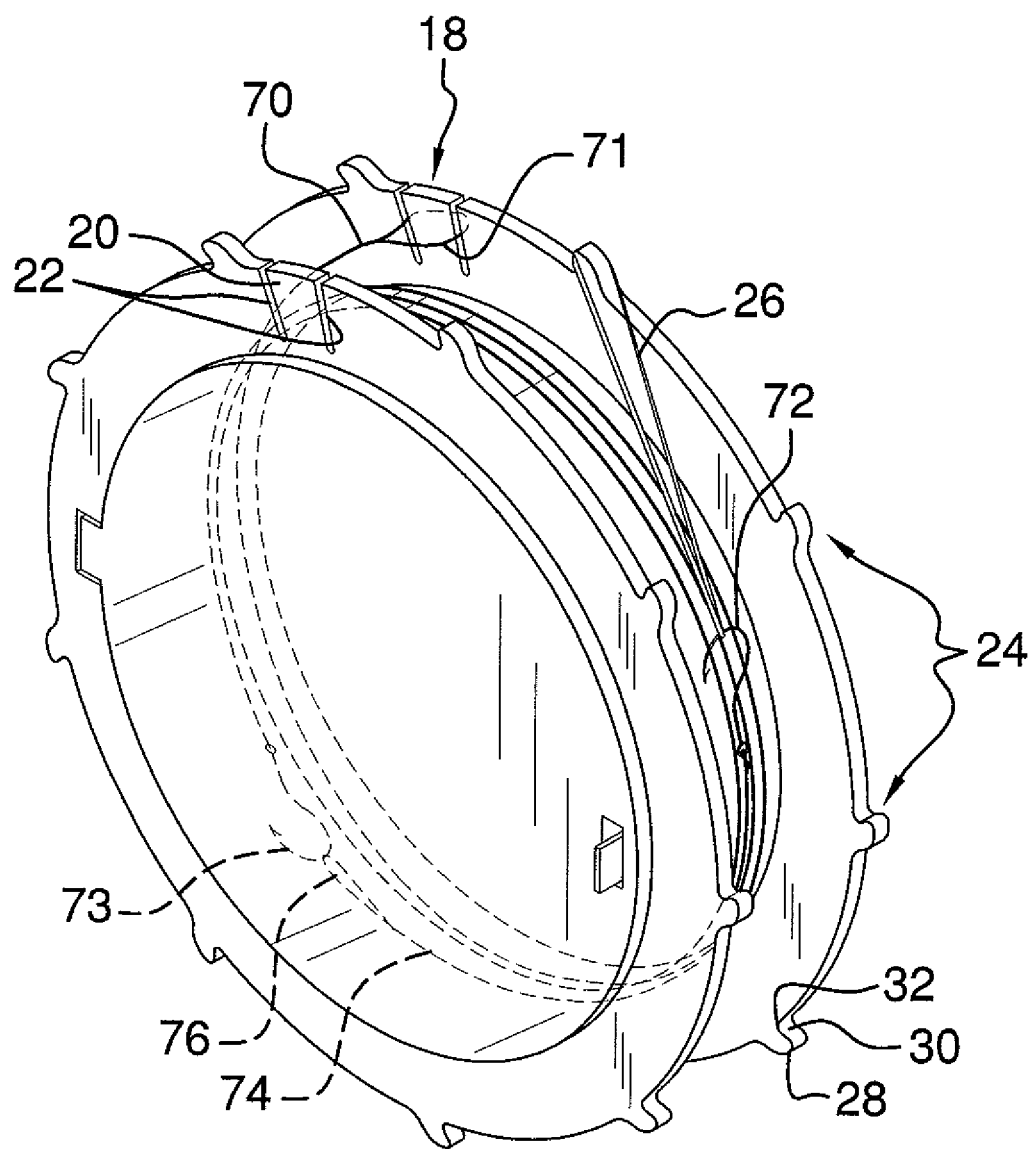
FIG. 6 is a perspective in-use view of an embodiment of the disclosure.

In use, wherein the cylinder 12 is configured to receive the fishing leader 70 such that the fishing leader 70 extends around the cylinder 12 and is retained on the cylinder 12 with one of the holds 24 and one of the catches 18. The size of the cylinder 12 will prevent the leader 70 from being subjected to shape-memory forces that would cause the leader 70 to wind upon itself while being attached to a fishing line as typically happens when fishing leaders are packed in conventional packaging either bending the leader or winding the leaders in tight coils. As can be seen in FIG. 6, the assembly allows for multiple leaders 70, 74 to be stored at one time on the cylinder 12. To accomplish this, the user will simply place a hoop 71 of a first leader 70 on a catch 18 and then extend the hook 73 from the first fishing leader 70 through the hoop 76 of a second fishing leader 74 and so on. The last fishing leader, i.e. the final in the series which is not extended through a hoop of another fishing leader, has its hook 72 engaged with the tether 26 so that it can be secured to a hold 24. The tether 26 may be resiliently elastic to ensure that the tether 26 can reach one of the holds 24 and, to a lesser extent, prevent a plurality of attached fishing leaders from releasing from each other.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A holder assembly configured to receive and store a plurality of fishing leaders, said assembly comprising:
   a cylinder being positioned between and being attached to a first lateral wall and a second lateral wall, each of said first and second lateral walls having a perimeter edge extending outwardly from said cylinder to define a spool, said cylinder having a diameter between 7.5 cm and 16.0 cm;
   a plurality of catches, each of said perimeter edges of said first and second lateral walls including at least one of said catches, each of said catches being configured to engage a hoop of a fishing leader when a fishing leader is extended along said cylinder, each of said catches comprising a tab formed between a pair of notches extending into a corresponding one of said perimeter edges, wherein said cylinder is positioned between said catches and an axis of said cylinder;
   a plurality of holds, each of said perimeter edges of said first and second lateral walls including at least one of said holds, wherein said cylinder is positioned between said holds and said axis of said cylinder;
   a tether being configured to engage a hook of the fishing leader, said tether being releasably engageable with one of said holds, said tether being comprised of a resiliently elastic material;
   each of said holds comprising a protrusion extending radially away from a central area of a corresponding one of said first and second lateral walls, each of said protrusions having at least one concavely arcuate edge to frictionally engage said tether, said tether including a loop for receiving one of said holds;
   said first wall having an opening therein to access a compartment bounded by said second wall and said cylinder;
   a door being pivotally coupled to said first wall, said door being selectively positioned in a closed positioned covering said opening or in an open position exposing said opening;
   a plurality of dividing walls being positioned within said compartment and dividing said compartment into a plurality of sections;
   wherein the cylinder is configured to receive the fishing leader such that the fishing leader extends around the cylinder and is retained on the cylinder with one of said holds and one of said catches;
   an outer edge of said tabs of said catches being substantially aligned with said perimeter edges of said first and second lateral walls;
   each of said holds comprising a protrusion positioned on and extending radially away from said perimeter edges of a corresponding one of said first and second lateral walls; and
   said door being pivotally attached at an inner edge of said first lateral wall formed by said opening.

* * * * *